(12) United States Patent
Tan et al.

(10) Patent No.: US 7,790,831 B1
(45) Date of Patent: Sep. 7, 2010

(54) HYPERBRANCHED POLYBENZAZOLES VIA AN $A_3+B_2$ POLYMERIZATION

(75) Inventors: Loon-Seng Tan, Centerville, OH (US); David H. Wang, Beavercreek, OH (US); Jong-Beom Baek, Chungbuk (KR)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 801 days.

(21) Appl. No.: 11/472,214

(22) Filed: Jun. 15, 2006

(51) Int. Cl.
*C08G 63/06* (2006.01)
(52) U.S. Cl. .................. 528/185; 528/208; 528/423
(58) Field of Classification Search .............. 528/423, 528/422, 337, 485, 271, 272, 185, 208; 524/714, 524/715
See application file for complete search history.

(56) References Cited

OTHER PUBLICATIONS

Jikei et al Synthesis of Hyperbranched Aromatic Polyamide from Aromatic Diamines and Trimesic Acid, Macromolecules, 1999, 32(6), 2061-2064.*
Baek, Jong-Beom; Park, Soo-Young; Price, Gary E.; Lyons, Christopher B.; Tan, Loon-Seng. Unusual thermal relaxation of viscosity- and-shear-induced strain in poly(ether-ketones) synthesized in highly viscous polyphosphoric acid/P2O5 medium. Polymer (2005), pp. 1543-15524, vol. 6(5).
Baek, Jong-Beom; Lyons, Christopher B.; Tan, Loon-Seng. Efficient synthesis of hyperbranched polyetherketones (PEKs) from A3+B2 polymerization by using different monomer solubility in reaction medium. Polymer Preprints (American Chemical Society, Division of Polymer Chemistry) (2004), pp. 1032-1033, vol. 45(1).
Baek, Jong-Beom; Lyons, Christopher B.; Tan, Loon-Seng. Synthesis and optical properties of organo-soluble hyperbranched polybenzothiazoles from A3+B2 monomers. Polymer Preprints (American Chemical Society, Division of Polymer Chemistry) (2004), pp. 647-648, vol. 45(2).
Baek, Jong-Beom; Tan, Loon-Seng. Improved syntheses of poly(oxy-1,3-phenylenecarbonyl-1,4-phenylene) and related poly(ether-ketones) using polyphosphoric acid/P2O5 as polymerization medium. Polymer (2003), pp. 4135-4147, vol. 44(15).
Baek, Jong Beom; Juhl, Shane B.; Lyons, Christopher B.; Farmer, Barry L.; Tan, Loon-Seng. Synthesis and properties of poly(arylene- etherketone) (PEK)-co-poly(benzobisthiazole) (PBZT)-co- poly(arylene-etherketone) (PEK) ABA triblock copolymers. Polymer Preprints (American Chemical Society, Division of Polymer Chemistry) (2002), pp. 1130-1131, vol. 43(2).
Baek, Jong-Beom; Lyons, Christopher B.; Laufersweiler, Michael C.; Tan, Loon-Seng. Carboxylic acid-terminated Hyperbranched Polybenzoxazole (PBO) and Its Star Block Copolymers. Polymer Preprints (American Chemical Society, Division of Polymer Chemistry) (2002), 832-833 vol. 44(2).

* cited by examiner

*Primary Examiner*—James Seidleck
*Assistant Examiner*—Gregory Listvoyb
(74) *Attorney, Agent, or Firm*—AFMCLO/JAZ; Bart S. Hersko

(57) ABSTRACT

In accordance with the present invention there are provided hyperbranched benzobisazole polymers having repeating units of the formulas:

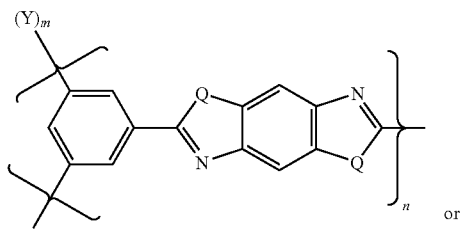

or

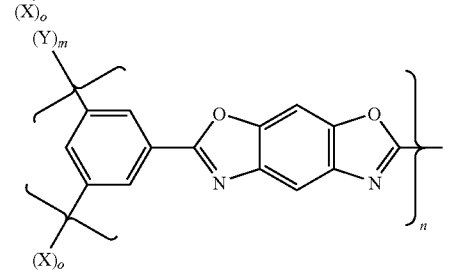

and hyperbranched bibenzazole polymers having repeating units of the formulas:

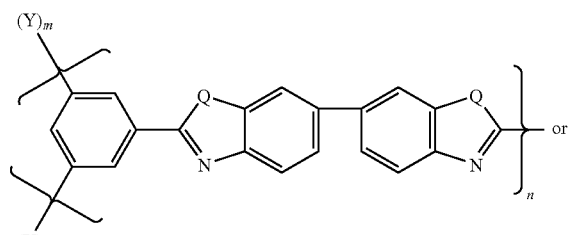

or

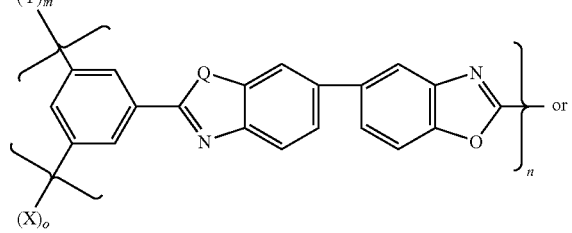

wherein Q is —S— or —NH—; the terminal groups X and Y are COOH and

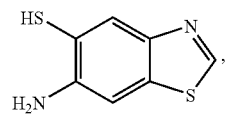

respectively, with their total number (X+Y) equals n+1, where n=degree of polymerization. The ratio X:Y can be controlled by varying the stoichiometric ratio of trimesic acid ($A_3$ monomer) and 2,5-diamino-1,4-dimercaptobenzene dihydrochloride ($B_2$ monomer) from 1:1 to 1.1.35.

1 Claim, No Drawings

HYPERBRANCHED POLYBENZAZOLES VIA AN A₃+ B₂ POLYMERIZATION

RIGHTS OF THE GOVERNMENT

The invention described herein may be manufactured and used by or for the Government of the United States for all governmental purposes without the payment of any royalty.

BACKGROUND OF THE INVENTION

The present invention relates to two new types of hyperbranched benzazole polymers.

Although aromatic-heterocyclic rigid-rod polybenzazoles such as polybenzobisthiazole (PBZT), polybenzobisoxazole (PBO), and polybenzobisimidazole (PBI) possess excellent thermal and mechanical properties, as well as interesting optical and electronic characteristics, their inherent insolubility in common organic solvents limits their applications. They are only soluble in strong acids such as methanesulfonic acid (MSA), trifluoromethanesulfonic acid (TFMSA), and sulfonic acid. These polymers, in general, are prepared from polycondensation of the respective monomers in mild acid such as polyphosphoric acid (PPA, 83% assay) at elevated temperature around 180° C.

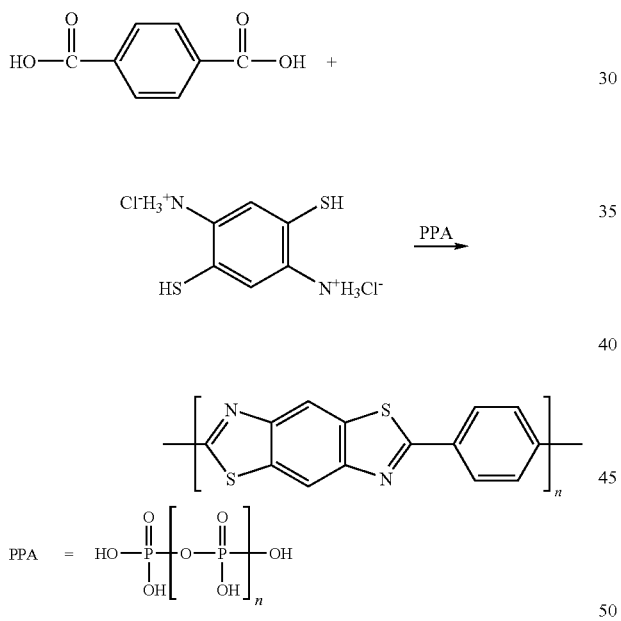

On the other hand, non-linear macromolecules such as dendrimers and hyperbranched polymers are attracting considerable amount of attention primarily because of their distinctly different properties compared to their linear counterparts. For example, they have better solubility and compared to their linear analogs. Although dendrimers have precisely controlled structures and unique properties, their preparations generally involve tedious, multi-step sequences that are not practical in mass production. Synthesis of a hyperbranched polymer, on the other hand, is a one-pot process. Large quantities of hyperbranched polymers can be easily produced from $AB_x$ ($x \geq 2$) monomers. In addition, there are important characteristics of hyperbranched polymers and dendrimers such as low viscosity and endgroup-controlled physical properties are quite similar. Therefore, hyperbranched polymers are better suited for the practical applications. Perhaps, an important disadvantage associated with a particular hyperbranched polymer is that the synthesis of its $AB_x$ monomer often-time still involves a good number of reaction steps from commercially available starting materials.

Therefore, to be more economically competitive, a promising approach entails direct syntheses of hyperbranched polymers for high temperature applications from commercially available $A_3$ and $B_2$ or $A_2$ and $B_3$. Although a number of hyperbranched polymers have been synthesized via either an $A_3+B_2$ or an $A_2+B_3$ polycondensation processes, these processes do have some inherent difficulty in preventing premature gelation as predicted by Carother's and statistical mechanics equations. Thus, an important key to the success of such an approach is to be able to control the reaction parameters such as the monomer concentrations and their time-dependent stoichiometric ratio, and stop the reaction before the gelation starts.

Accordingly, it is an object of the present invention to provide novel hyperbranched benzobisthiazole and bibenzothiazole polymers generated from a $A_3+B_2$ polymerization in poly(phosphoric acid).

Other objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

In accordance with the present invention there are provided hyperbranched benzobisazole polymers having repeating units of the formulas:

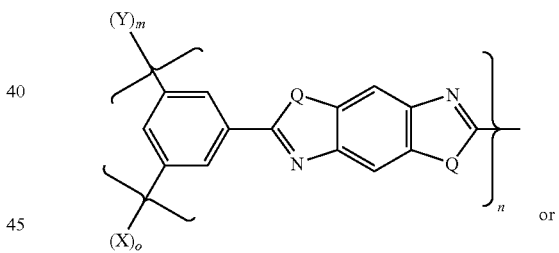

or

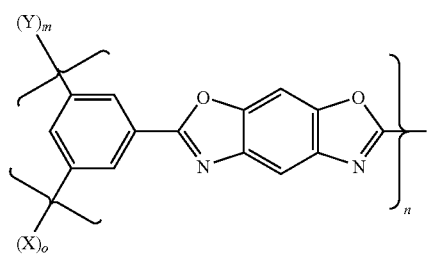

and hyperbranched bibenzazole polymers having repeating units of the formulas:

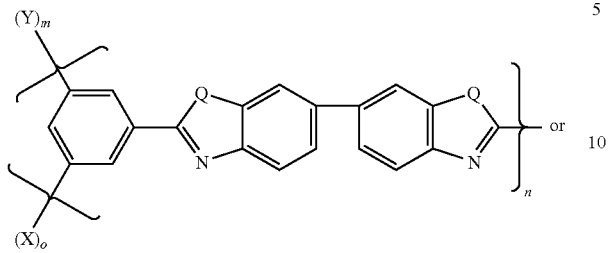

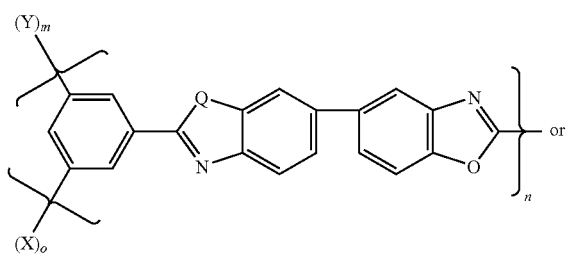

wherein Q is —S— or —NH—; the terminal groups X and Y are COOH and

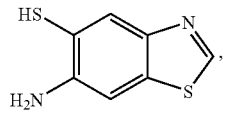

respectively, with their total number (X+Y) equals n+1, where n=degree of polymerization. The ratio X:Y can be controlled by varying the stoichiometric ratio of trimesic acid ($A_3$ monomer) and 2,5-diamino-1,4-dimercaptobenzene dihydrochloride ($B_2$ monomer) from 1:1 to 1.1.35.

DETAILED DESCRIPTION OF THE INVENTION

An initial set of experiments was conducted to determine the effect of the stoichiometry ($A_3$:$B_2$) on the rate of cross-linking (causing gelation) for the polymerization of 1,3,5-benzenetricarboxylic acid ($A_3$ monomer) and 1,4-diamino-2,5-dimercaptobenzene ($B_2$ monomer) in polyphosphoric acid (PPA) under typical reaction conditions for the synthesis of rigid-rod poly(benzobisthiazole) or PBZT. Thus, two hyperbranched PBZT's were first prepared by adding 1,3,5-benzenetricarboxylic acid

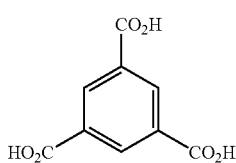

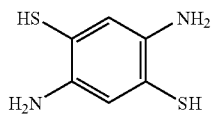

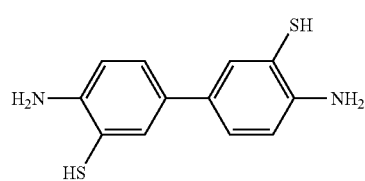

($A_3$ monomer) into the a solution of 1,4-diamino-2,5-dimercaptobenzene ($B_2$ monomer) in poly(phosphoric acid). The feed ratios of the two monomers, namely 1,3,5-benzenetricarboxylic acid: 1,4-diamino-2,5-dimercaptobenzene, or simply $A_3$:$B_2$ were set at 1:1 and 1.5:1. When the polymerization was conducted at 175° C. in 30 min, organo-soluble PBZTs were obtained in both cases. When it was conducted over 30 min, an insoluble gel formed in both cases. Therefore, shorter polymerization time is required.

Similar results were obtained when hyperbranched poly(bibenzothiazoles), abbreviated as PBBT's, were synthesized by adding 1,3,5-benzenetricarboxylic acid ($A_3$) into the solution of 3,3-dimercaptobenzidine ($B'_2$) in PPA. The feed ratios (1,3,5-benzenetricarboxylic acid: 3,3-dimercaptobenzidine or $A_3$:$B'_2$) of two monomers were 1:1 and 1.5:1. The PBBTs that were isolated after polymerization at 175° C. for 30 minutes were soluble in methanesulfonic acid (MSA) and N-methylpyrrolidinone (NMP) but when the polymerization was conducted longer than 30 min, the insoluble gels formed instead.

Therefore, a different approach was used to prepare carboxylic acid-terminated PBZT and PBBT (Scheme 1). Carboxylic acid terminated hyperbranched polymers were preferred to those terminated with ortho-aminothiobenzene functions because the latter one was not stable in the air. The key point of the method is to prevent the gel formation in $A_3$ and $B_2$ polymerization, and adding the $B_2$ monomer slowly to the diluted $A_3$ solution in poly(pphosphoric acid) accomplished this objective.

Thus, 1,3,5-benzenetricarboxylic acid ($A_3$) was dissolved first in PPA at 180° C. and cooled to 120° C. Then, 1,4-diamino-2,5-dimercaptobenzene dihydrochloric acid ($B_2$) was added into this PPA mixture which was then heated at 60° C. for 24 h and 120° C. for 12 h. The $B_2$/PPA mixture was added into 1,3,5-benzenetricarboxylic acid PPA solution slowly. The mixture was heated 130° C. for 1 h, 150° C. for 12 h and 180° C. for 8 h after the addition. The $A_3$ and $B_2$ feed ratios were 1:1, 1:1.2, 1:1.35 and 1:1.5. The solid content was around 2-3%. All the PBZTs except last batch (feed ratio 1:1.5) were soluble in PPA throughout the polymerization. The insoluble gel formed for the PBZT with feed ratio 1:1.5 after the reaction time longer than 1 h at 180° C. At the end of the reaction, the mixture was poured into water and the polymer was collected by suction filtration, extracted with water for one week and dried under reduced pressure (1 mmHg) at 100° C. for 48 h.

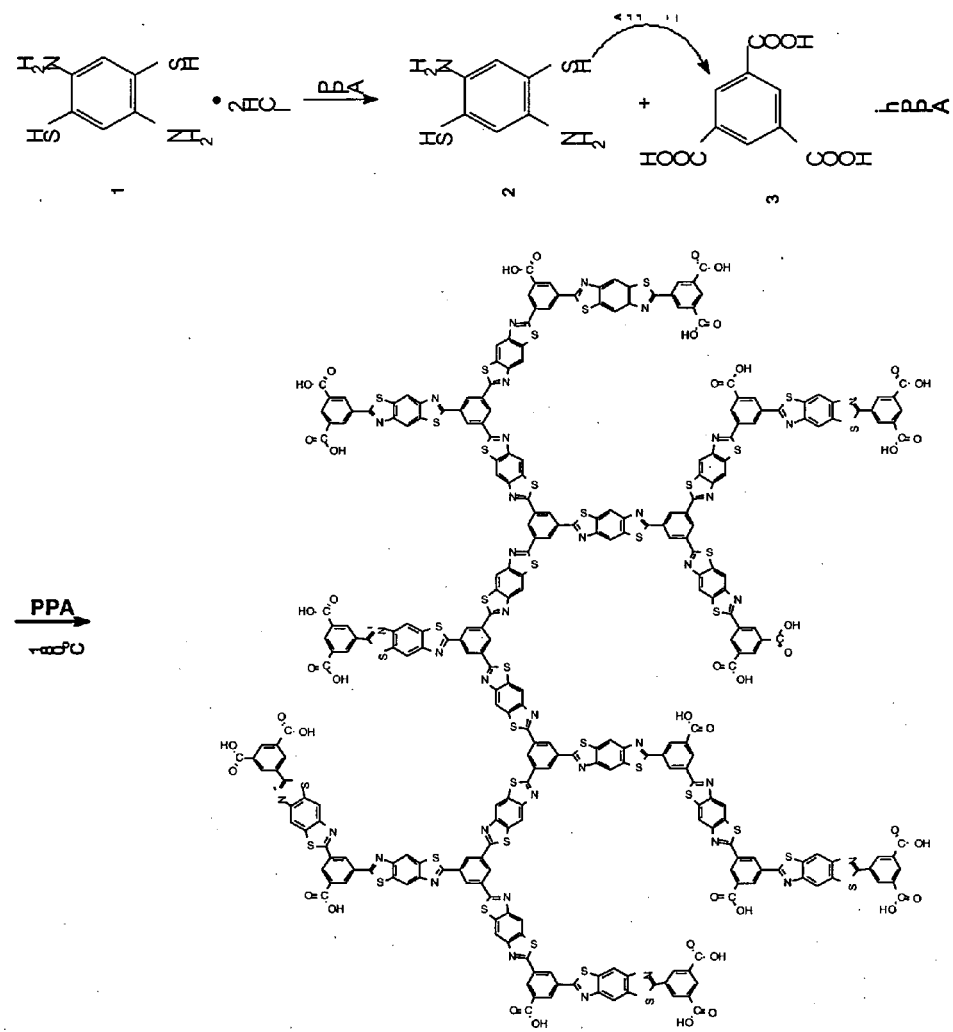
| PBZT-1 | a | b | c | d |
|---|---|---|---|---|
| 1 | 1 | 1.2 | 1.35 | 1.5 |
| 3 | 1 | 1 | 1 | 1 |
[0015] Scheme 1. PBZT- Preparation from 1,3,5-benzenetricarboxylic acid and 1,4-diamino-2,5-dimercaptobenzene.

Similarly, PBBT-a-d were obtained when 1,3,5-benzenetricarboxylic acid ($A_3$) and 3,3-dimercaptobenzidine ($B_2$) (Scheme 2) were used in the polymerization in the $A_3$:$B_2$ ratios of 1:1; 1:1.2; 1:1.35; 1:1.5 following the same sequence of operation as the synthesis of PBZT-a-d. All the PBBTs except the last one (feed ratio 1:1.5) were soluble in PPA throughout the polymerization process (>20 h). The insoluble gel formed for the PBZT with feed ratio 1:1.5 after the reaction time longer than 1 h at 180° C.

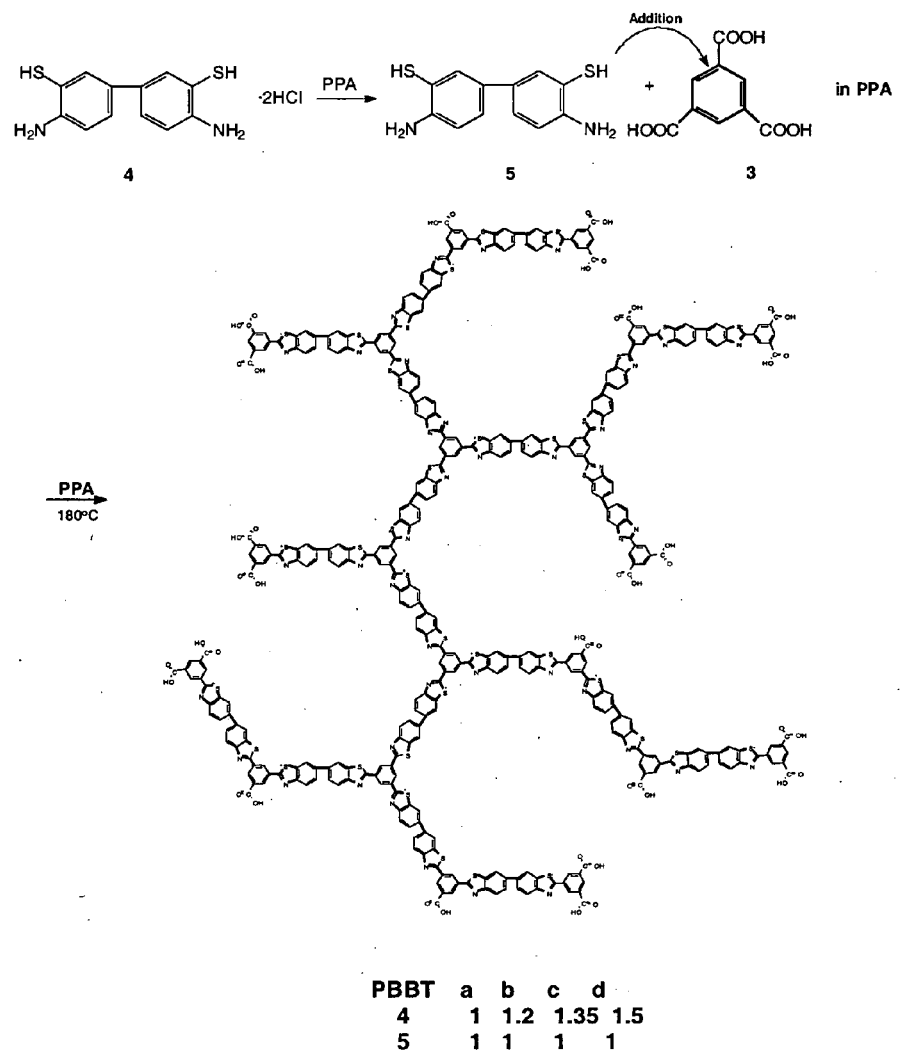
| PBBT | a | b | c | d |
|---|---|---|---|---|
| 4 | 1 | 1.2 | 1.35 | 1.5 |
| 5 | 1 | 1 | 1 | 1 |
[0018] Scheme 2. PBBT Preparation from 1,3,5-benzenetricarboxylic acid and 3,3-dimercaptobenzidine.

The hyperbranched PBZTs and PBBTs were subjected to physical characterizations such as solubility testing, viscosity, IR and thermal analysis.

PBZT-a, PBZT-b and PBZT-c as well as PBBT-a, PBBT-b, and PBBT-c are soluble in acids such as methanesulfonic acid (MSA) and PPA, and in basic aprotic solvents, such as NMP, N,N-dimethylforamide (DMF) and N,N-dimethylacetamide (DMAc). PBZT-d and PBBT-d, which were isolated from the polymerization gel from precipitation into water, are insoluble in any strong acid or any solvent tested. Thus, PBZT-a-c and PBBT-a-c were dissolved in MSA and their intrinsic viscosities were measured at 30° C. The values range from 0.14 to 1.04 dL/g and 0.23 to 1.21 dL/g for PBZT and PBBT series, respectively. The viscosities increased with 1,3,5-benzenetricarboxylic acid content, which seems to indicate that the molecular weight and benzobisthiazole or bibenzothiazole branches increased with $A_3$ monomer content.

As expected, FT-IR spectrum of PBZT-a (with theoretically 100% $CO_2H$ end-groups) exhibited strong broad absorption at 2500-3500 $cm^{-1}$ and strong stretching band at 1701 $cm^{-1}$ that are associated with the CO in carboxylic acid functions.

The differential scanning calorimetry (DSC) samples (powder form) were subjected to two cycles of heating from room temperature to 400° C. and then cooling to 20° C., with the same rate of 10° C./min. The $T_g$'s of all samples were well beyond their decomposition temperatures, much like the (linear) rigid-rod benzpbisazole polymers such as poly(benzobisoxazole), poly(benzobisthiazole), and poly(benzobisimidazole). However, the first heating scan displayed strong endothermic peak in the range of room temperature to 150° C. It originates from the loss of water. Since the hygroscopic nature of highly polar groups on the peripheries of their structures, the hyperbranched PBZTs took up significant amount of moisture during handling process. There was also an exothermic peak attributed to the thermal cyclization was detected both samples PBZT-a and PBZT-d around 360° C. in the first heating scan, ascribable to the surface carboxylic acids and o-aminomercaptobenzenes undergoing further condensation to form the benzothiazole units with water as volatile by-product. In the second heating scan, the exothermic peak disappeared and the exothermic peak became smaller and was shifted to higher temperature at 375° C.

The thermogravimetric analysis (TGA) samples (powder form) were also subjected to heating from room temperature to 800° C. both in air and helium. Both samples, PBZT-a and PBZT-d, run in air and in helium started to loose 2-4 weight percents around 100° C., which is due to the loss of absorbed moisture. Additional weight loses of both samples PBZT-a and PBZT-d occurred from 260° C. stemming from the lost of water as the by-product of further thermal cyclization. These results are in good agreement with DSC results.

The following examples illustrate the invention:

Example 1

Polymerization of Trimesic Acid ($A_3$)+1,4-Diamino-2,5-dimercaptobenzene ($B_2$) in 1:1 Stoichiometric Ratio (Hyperbranched PBZT-a)

Into a 200 mL resin flask equipped with a high torque mechanical stirrer, a $N_2$ inlet and outlet, and a pressure regulator, 1,3,5-benzenetricarboxylic acid (0.9934 g, 4.00 mmol) and polyphosphoric acid (PPA, 30.0 g) were placed and heated to 170° C. for 2 h until all the solid dissolved. 2,5-Diamino-1,4-dimercaptobenzene dihydrochloride (0.9807 g, 4.00 mmol) and PPA (30.0 g) were charged into the other 100 mL resin flask equipped with a high torque mechanical stirrer, a $N_2$ inlet and outlet, and a pressure regulator. The mixture was heated to 60° C. for 24 h and 120° C. for 12 h until the mixture became homogeneous and no further hydrochloric acid was monitored at gas outlet. Upon completion of the dehydrochlorination, the mixture was cooled down to 100° C. and added into the 1,3,5-benzenetricarboxylic acid/PPA mixture slowly. The residue 2,5-Diamino-1,4-dimercaptobenzene was rinsed with PPA (15 g) and added slowly. The mixture was then heated progressively 130° C. for 1 h, 140° C. for 5 h and 180° C. for 12 h. The copper color homogeneous dope became very viscous. At the end of the reaction, the mixture was poured into water and opaque fibrous polymer collected by suction filtration. The polymer was grinded with a Waring blender, collected by suction filtration, extracted with water in a Soxhlet extractor for a week, and finally dried under reduced pressure (1 mmHg) at 100° C. for 48 h to give essentially quantitative yield. Intrinsic viscosity, [η], in MSA was 0.14 (dl/g). Calcd. for $C_{18.5}H_{9.5}, N_3OS_3$: C, 51.56%; H, 2.48%; N, 10.89%. Found: 54.92%; H, 2.61%; N, 7.44%.

Example 2

Polymerization of Trimesic Acid ($A_3$)+1,4-Diamino-2,5-dimercaptobenzene ($B_2$) in 1:1.2 Stoichiometric Ratio (Hyperbranched PBZT-b)

Hyperbranched PBZT-b was synthesized from 1,3,5-benzenetricarboxylic acid (1.2418 g, 5.00 mmol) and 2,5-diamino-1,4-dimercaptobenzene dihydrochloride (1.471 g, 6.00 mmol) using the same procedure used for PBZT-a (Example 1) to afford essentially quantitative yield. Intrinsic viscosity, [η], in MSA was 0.27 (dl/g). Calcd. for $C_{18.5}H_{9.5}, N_3OS_3$: C, 57.56%; H, 2.48%; N, 10.89%. Found: C, 55.31%; H, 2.51%; N, 8.70%.

Example 3

Polymerization of Trimesic Acid ($A_3$)+1,4-Diamino-2,5-dimercaptobenzene ($B_2$) in 1:1.35 Stoichiometric Ratio (Hyperbranched PBZT-c)

Hyperbranched PBZT-c was synthesized from 1,3,5-benzenetricarboxylic acid (0.9934 g, 4.00 mmol) and 2,5-diamino-1,4-dimercaptobenzene dihydrochloride (1.3240 g, 5.40 mmol) using the same procedure used for PBZT-a (Example 1) to afford essentially quantitative yield. Intrinsic viscosity, [η], in MSA was 1.04 (dl/g). Calcd. for $C_{18.5}H_{9.5}, N_3OS_3$: C, 57.56%; H, 2.48%; N, 10.89%. Found: C, 56.18%; H, 2.45%; N, 9.32%.

Example 4

Polymerization of Trimesic Acid ($A_3$)+1,4-Diamino-2,5-dimercaptobenzene ($B_2$) in 1:1.5 Stoichiometric Ratio (Hyperbranched PBZT-d)

Into a 200 mL resin flask equipped with a high torque mechanical stirrer, a $N_2$ inlet and outlet, and a pressure regulator, 1,3,5-benzenetricarboxylic acid (0.9934 g, 4.00 mmol) and polyphosphoric acid (PPA, 30,0 g) were placed and heated to 170° C. for 2 h until all the solid dissolved. 2,5-Diamino-1,4-dimercaptobenzene dihydrochloride (1.4718 g, 6.00 mmol) and PPA (30.0 g) were charged into the other 100 mL resin flask equipped with a high torque mechanical stirrer, a $N_2$ inlet and outlet, and a pressure regulator. The mixture was heated to 60° C. for 24 h and 120° C. for 12 h until the mixture became homogeneous and no further hydrochloric acid was monitored at gas outlet. Upon completion of the dehydrochlorination, the mixture was cooled down to 100° C. and added into the 1,3,5-benzenetricarboxylic acid/PPA mixture slowly. The residue 2,5-Diamino-1,4-dimercaptobenzene was rinsed with PPA (15 g) and added slowly. The mixture was then heated progressively 130° C. for 1 h and 140° C. for 5 h. The mixture was further heated to 180° C. for 1 h, the deep red homogeneous dope became very viscous. Further stirring at 180° C., the reaction mixture was too dry to stir efficiently that is indicative of starting gelation. At the end of the reaction, the gelation dope was poured into water and pink polymer collected by suction filtration. The polymer was grinded with a Waring blender, collected by suction filtration, extracted with water in a Soxhlet extractor for a week, and finally dried under reduced pressure (1 mmHg) at 100° C. for 48 h to give essentially quantitative yield. Intrinsic viscosity, [η], was unable to determine because the polymer was insoluble in MSA. Calcd. for $C_{18.5}H_{9.5}N_3OS_3$: C, 57.56%; H, 2.48%; N, 10.89%. Found: C, 56.45%; H, 2.45%; N, 9.53%.

Example 5

Polymerization of Trimesic Acid ($A_3$)+1,4-Diamino-2,5-dimercaptobenzene ($B_2$) in 1:1 Stoichiometric Ratio (Hyperbranched PBBT-a)

Hyperbranched PBBT-a was synthesized from 1,3,5-benzenetricarboxylic acid (0.7451 g, 3.00 mmol) and 3,3-dimercaptobenzidine dihydrochloride (0.9638 g, 3.00 mmol) using the same procedure used for PBZT-a (Example 1) to afford essentially quantitative yield. Intrinsic viscosity, [η], in MSA was 0.23 (dl/g). Calcd. for $C_{28.5}H_{16.5}N_3OS_3$: C, 66.70%; H, 3.24%; N, 8.18%. Found: C, 64.25%; H, 3.27%; N, 6.84%.

Example 6

Polymerization of Trimesic Acid ($A_3$)+1,4-Diamino-2,5-dimercaptobenzene ($B_2$) in 1.2:1 Stoichiometric Ratio (Hyperbranched PBBT-b)

Hyperbranched PBBT-b was synthesized from 1,3,5-benzenetricarboxylic acid (0.7451 g, 3.00 mmol) and 3,3-dimercaptobenzidine dihydrochloride (1.1566 g, 3.60 mmol) using the same procedure used for PBZT-a (Example 1) to afford essentially quantitative yield. Intrinsic viscosity, [η], in MSA was 0.35 (dl/g). Calcd. for $C_{28.5}H_{16.5}N_3OS_3$: Calcd: C, 66.70%; H, 3.24%; N, 8.18%. Found: C, 64.72; H, 3.33%; N, 6.88%.

Example 6

Polymerization of Trimesic Acid ($A_3$)+1,4-Diamino-2,5-dimercaptobenzene ($B_2$) in 1.35:1 Stoichiometric Ratio (Hyperbranched PBBTc)

Hyperbranched PBBTc was synthesized from 1,3,5-benzenetricarboxylic acid (0.9934 g, 4.00 mmol) and 3,3-dimercaptobenzidine dihydrochloride (1.7352 g, 5.40 mmol)) using the same procedure used for PBZT-a to afford essentially quantitative yield. Intrinsic viscosity, [η], in MSA was 1.21 (dl/g). Calcd. for $C_{28.5}H_{16.5}N_3OS_3$: C, 66.70%; H, 3.24%; N, 8.18%. Found: C, 63.48; H, 3.03%; N, 7.80%.

Example 7

Polymerization of Trimesic Acid ($A_3$)+1,4-Diamino-2,5-dimercaptobenzene ($B_2$) in 1.5:1 Stoichiometric Ratio (Hyperbranched PBBT-d)

Hyperbranched PBBT-d was synthesized from 1,3,5-benzenetricarboxylic acid (0.9934 g, 4.00 mmol) and 3,3-dimercaptobenzidine dihydrochloride (1.9277 g, 6.00 mmol)) using the same procedure used for PBZT-d (Example 4) to afford essentially quantitative yield. Intrinsic viscosity, [η], was unable to determine because the polymer was insoluble in MSA. Calcd. for $C_{28.5}H_{16.5}N_3OS_3$: C, 66.70%; H, 3.24%; N, 8.18%. Found: C, 66.46%; H, 2.96%; N, 8.26%.

We claim:
1. A family of benzobisazole-based hyperbranched polymers having repeating units of the following formulas:

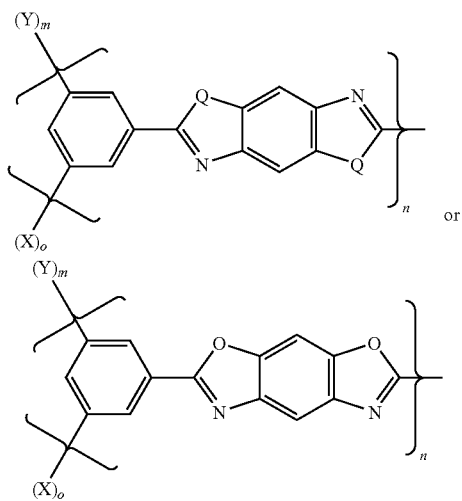

wherein Q is —S— or —NH—; the terminal groups X are carboxylic acids and Y are

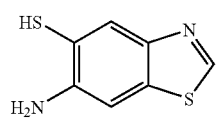

with their total number (X+Y) equals n+1, where n=degree of polymerization; The ratio of X:Y is controlled by varying the stoichiometric ratio of trimesic acid ($A_3$ monomer) and 2,5-diamino-1,4-dimercaptobenzene dihydrochloride ($B_2$ monomer) from 1:1 to 1:1.35.

* * * * *